United States Patent
Hayashi

[11] 3,875,503
[45] Apr. 1, 1975

[54] DUAL SLOPE TYPE RESISTANCE DEVIATION MEASURING APPARATUS

[75] Inventor: Eiji Hayashi, Tokyo, Japan

[73] Assignee: Yokogawa Electric Works, Ltd., Tokyo, Japan

[22] Filed: Nov. 13, 1973

[21] Appl. No.: 415,533

[30] Foreign Application Priority Data
Nov. 15, 1972 Japan............................ 47-114396

[52] U.S. Cl. ............................. 324/62, 73/362 AR
[51] Int. Cl. .......................................... G01r 27/02
[58] Field of Search .................... 324/62; 73/362 AR

[56] References Cited
UNITED STATES PATENTS

| | | | |
|---|---|---|---|
| 3,725,644 | 4/1973 | Bailey........................ | 73/362 AR X |
| 3,754,442 | 8/1973 | Arnett......................... | 324/62 X |
| 3,786,350 | 1/1974 | Munt ......................... | 324/62 |

*Primary Examiner*—Stanley T. Krawczewicz
*Attorney, Agent, or Firm*—Parmelee, Johnson & Bollinger

[57] ABSTRACT

A resistance deviation measuring device, of the type used for measuring a temperature with temperature-sensitive resistance and for obtaining a digital signal representing the measured temperature, is characterized by a simple and reliable arrangement operating with the characteristics of a dual slope type analog-digital converter, i.e., with an integrator for first integrating an unknown analog signal for a predetermined time period and for then integrating a reference signal of inverse polarity with respect to the analog signal until the integrator is restored to its initial value, and with digital counting means for digitally measuring a time interval ending when the integrating means is restored to its initial value. The resistance deviation measuring device of the present invention connects the unknown temperature-sensitive resistance to a reference resistance in series, and uses a series voltage source to generate the same current flow through both resistances to produce the unknown analog signal and reference signal respectively. A switch connects the unknown resistance to the integrator for the predetermined time period, and then connects the reference resistance to the integrator until it is restored to its initial value. A timing circuit initiates the counting of the time interval measured by the digital counting means a predetermined amout of time, equal to the predetermined time period, after the reference signal is connected to the integrator. The digital counting means then digitally represents the deviation of the unknown resistance from the reference resistance.

8 Claims, 5 Drawing Figures

DUAL SLOPE TYPE RESISTANCE DEVIATION MEASURING APPARATUS

BACKGROUND OF THE INVENTION

1. Field of the Invention

This invention relates to a resistance deviation measuring device, and more particularly to a resistance deviation measuring device of dual slope type for producing a digital signal representing a resistively measured physical characteristic such as temperature.

2. Description of the Prior Art

In the measurement of a physical characteristic such as temperature, in order to obtain a digital signal representing the measured physical quantity, it is the usual practice first to obtain an analog electric signal varying with the temperature measured and then to convert the analog signal into a digital signal by means of an analog-to-digital converter. In known measuring devices, a separate circuit converts the temperature into an analog electric signal which is fed to a standard analog-to-digital converter. Where a temperature-measuring resistance such as a thermistor is used as a temperature detector, the circuit for converting the temperature into an analog electric signal generally consists of a bridge including the temperature-measuring resistance and an amplifier for amplification of an unbalance voltage of the bridge. As for the analog-to-digital converter, it is a generally accepted expedient to employ a dual slope type analog-to-digital converter which is almost free from noise influences. The necessity for employing these two different means in the measurement of temperatures has arisen from the fact that there has been no available device which is capable of directly converting a thermal signal in the form of a variable resistance into a digital signal.

SUMMARY OF THE INVENTION

It is a principal object of the present invention to provide an improved resistance deviation measurement device which is capable of converting directly into a digital signal a resistance variation which corresponds to a measured physical quantity. It is a further object of the present invention to provide a resistance deviation measurement device which employs a simple, economical and reliable construction and which operates with the advantageous characteristics of a dual slope converter.

In a preferred embodiment of the invention to be described hereinbelow in detail, the resistance deviation measuring device determines the deviation of an unknown resistance from a predetermined resistance value with dual slope type converter means having integrating means for first integrating an unknown analog signal for a predetermined time period and for then integrating a reference signal of inverse polarity to the analog signal until the integrating means is restored to its initial value, and having digital counting means digitally measuring a time interval ending when the integrating means is restored to its initial value. The resistance deviation measuring device is characterized by a reference resistance, and means such as a voltage source for generating the same current flow through both the unknown resistance and the reference resistance to produce thereacross the unknown analog signal and the reference signal respectively. Switch means connect the unknown analog signal appearing across the unknown resistance to the integrating means for said predetermined time period and then connect the reference signal appearing across the reference resistance with inverse polarity to the integrating means until it is restored to its initial value. Means such as a timing signal generator initiates the time interval measured by the digital counting means a predetermined amount of time after the reference signal is connected to the integrating means, and the digital counting means thereby represents the deviation of the unknown resistance from a predetermined resistance value. The described resistance deviation measuring device thus has a simplified construction directly converting a resistance deviation into a digital signal.

In further aspects of the invention, the unknown resistance is in series with the reference resistance, their junction is at the ground level of the integrating means, and both are in series with a voltage source to generate the same current flow therethrough and to cause the device to integrate through a cycle of operation independently of the value of the voltage source, thereby promoting reliability and accuracy of the device.

These and other objects, aspects and advantages of the invention will be pointed out in, or apparent from, the detailed description hereinbelow, considered together with the following drawings.

DESCRIPTION OF THE PREFERRED EMBODIMENT

Figure 1:
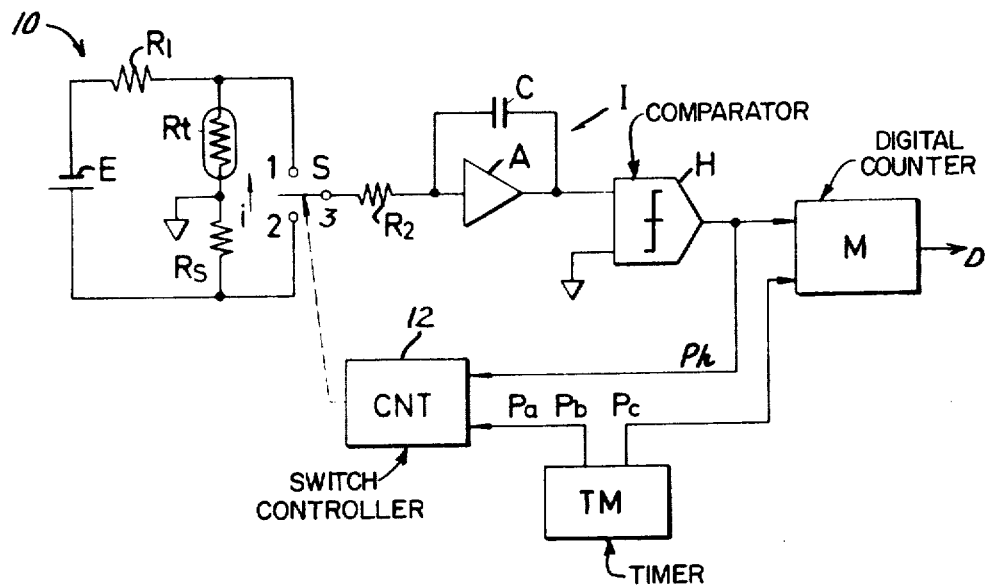
FIG. 1 is a diagram showing an embodiment of the present invention.

FIG. 1 illustrates a resistance deviation measurement device 10 constructed according to the invention and arranged to obtain a digital signal D representing the temperature measured by a temperature-sensitive resistance $R_t$, for examle, a thermistor. As shown in FIG. 1, a DC voltage source E, a resistance R1, the temperature-measuring resistance $R_t$, and a reference resistance $R_s$ are connected in series to cause a current $i$ to flow through $R_t$ and RS. The junction of the temperature-measuring resistance $R_t$ and the reference resistance $R_s$ is grounded. A change-over switch S, which may be an electronic switch, has fixed contacts 1 and 2 which are connected to the other ends of the temperature-measuring resistance $R_t$ and reference resistance $R_s$, respectively. A movable contact 3 of switch S is connectable to contacts 1 and 2 under the control of a switch control circuit 12.

Connected to movable contact 3 of switch S is an integrator I with an input resistance R2, an operational amplifier A, and a feedback capacitor C. A comparator H is connected to compare the output voltage of the integrator I with the ground voltage for producing an output pulse $P_h$, as shown in FIG. 2c, when the output voltage $V_i$ of the integrator I reaches the level of the ground voltage. As shown in FIG. 1, output pulse $P_h$ is applied to the switch control circuit 12, and to a digital counting circuit M which is arranged to measure a time interval ending with pulse $P_h$ and to produce a corresponding digital signal D.

A timing signal generator TM periodically produces three pulses $P_a$, $P_b$ and $P_c$ at a constant time interval.

The pulses P*a* and P*b* are fed to the switch control circuit 12 while the pulse P*c* is fed to the digital counting circuit M. The switch control circuit 12 is arranged to control the change-over switch S in response to the pulses P*a* and P*b* and in response to the output pulse P*h* from the comparator H. More particularly, the switch S is actuated so that movable contact 3 is thrown onto the contact 1 by the pulse P*a* and onto the contact 2 by the pulse P*b* while it is put in a neutral position between contacts 1 and 2 by the output pulse P*h* from comparator H. The output pulse P*c* of the timing signal generator TM is applied to digital counting means M to cause it to start measuring the time interval ended by the output pulse P*h* of the comparator H.

Figure 2A:
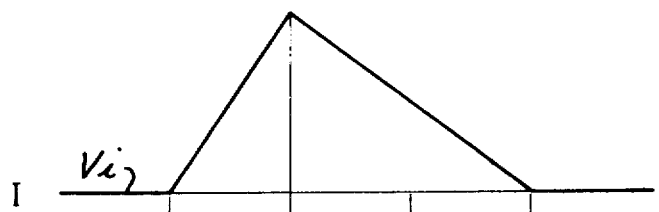
FIGS. 2a through 2d are graphs having a common horizontal time scale, illustrating the operation of the device shown in FIG. 1.
Figure 2B:
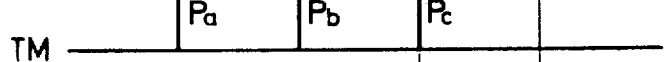
Figure 2C:
Figure 2D:

Operation of the measuring device 10 described above is easily understood with the aid of the graphs of FIGS. 2*a* through 2*d*. When the timing signal generator TM produces a pulse P*a*, the change-over switch S has its movable contact 3 thrown to contact 1 and the voltage across the temperature-measuring resistance R*t* is fed to the integrator I as an input signal, so that the output voltage V*i* of the integrator I, which is initially at ground level or zero, is increased in a positive direction as shown in FIG. 2*a*. A predetermined period of time T*c* after the generation of the first pulse P*a*, a second pulse P*b* is produced to throw the movable contact 3 of change-over switch S to the contact 2. As a result, the voltage across the reference resistance R*s* is fed to the integrator I as its input signal. Since the polarity of the voltage across the reference resistance R*s* is inverse with respect to that of the voltage appearing across the temperature-measuring resistance R*t*, the output voltage V*i* of the integrator I is reduced toward its initial zero level. While the output of integrator I is being reduced, the third pulse P*c* is produced, a period of time T*c* after generation of the pulse P*b*. Upon generation of pulse P*c*, digital counting means M starts counting, as shown schematically by the ramp illustrated in FIG. 2*d*. When the output voltage V*i* of the integrator I reaches the zero level, the comparator H produces an output pulse P*h*, causing counter means M to end its counting interval and causing the change-over switch S to be shifted into the neutral position to block the supply of input signals to the integrator I until the next series of pulses P*a*, P*b* and P*c*.

the output V*i* of the integrator I thus is restored to its initial state. For a complete cycle of operation, then, the following equation is established:

$$-\frac{1}{(R2)(C)} \left[ \int_0^{Tc} (-Rt)\, i\, dt + \int_{Tc}^{2Tc + Tx} (Rs)\, i\, dt \right] = 0 \quad (1)$$

where T*x* represents the digitally measured time interval between the pulse P*c* and the output pulse P*h* of the comparator H. Since current *i* and resistances R*t* and R*s* are constant over the intervals of integration, equation (1) above yields the following relationship:

$$Tx = \left(\frac{Rt}{Rs} - 1\right) Tc \quad (2)$$

Since the time period T*c* in equation (2) above is a constant, it follows that if reference resistance R*s* is selected to be the value of the temperature-measuring resistance R*t* at a reference temperature (e.g., 0°C), then T*x* is given by equation (2) is proportional to the temperature to be measured. Thus, a digital signal D indicating the measured temperature value is obtained by digitally counting the time interval T*x* between the pulse P*c* and the output pulse P*h* of the comparator H by means of the digital counting circuit M.

It will be appreciated from the foregoing description that in the device 10 constructed according to the present invention, a thermal resistance signal may be directly converted into a digital signal simply and in one step.

Particular major advantages of the measuring device 10 according to the instant invention are that the DC power source E is not required to be of high precision or stability, and satisfies its purpose if it is capable of maintaining stability for the short period of time corresponding to one cycle of operation of the integrator I. There is no need in the present invention for the provision of a high precision power source for the generation of a precise and stable reference voltage as is indispensably required in the existing analog-to-digital converters. In contrast to the difficulty of obtaining precision power sources, it is very easy to obtain a reference resistance of high precision and stability, and the present invention therefore is more economical to provide.

Furthermore, by selecting the time period T*c* with a duration corresponding to an integral multiple of the period of estimated AC noise, it is possible to obtain a measurement which is not influenced by such AC noise. It will be clear from the foregoing description that the present invention provides a digital temperature measuring device which is accurate and reliable in operation and which can be fabricated at low cost.

As is clear from equation (2), the device of the invention is essentially a resistance deviation measuring device, so that, if the temperature-measuring resistance R*t* is replaced by an unknown resistance R*x*, it is possible to measure a deviation of the unknown resistance R*x* from the reference resistance R*s*.

Although a specific embodiment of the invention has been disclosed herein in detail, it is to be understood that this is for the purpose of illustrating the invention, and should not be construed as necessarily limiting the scope of the invention, since it is apparent that many changes can be made to the disclosed structures by those skilled in the art to suit particular applications.

I claim:

1. A resistance deviation measuring device for determining the deviation of an unknown resistance from a predetermined resistance value with dual slope type converter means having integrating means for first integrating an unknown analog signal for a predetermined time period and for then integrating a reference signal of inverse polarity with respect to the analog signal until the integrating means is restored to its initial value, and having digital counting means digitally measuring a time interval ending when the integrating means is restored to its initial value, the resistance deviation measuring device being characterized by:

a reference resistance;

means for generating the same current flow through the unknown resistance and the reference resistance to produce thereacross the unknown analog signal and the reference signal respectively;

switch means for first connecting the analog signal developed across the unknown resistance to the integrating means for said predetermined time period and then connecting the reference signal developed across the reference resistance with inverse polarity to the integrating means until it is restored to its initial value; and means for initiating the time interval measured by the digital counting means a predetermined amount of time after the reference signal is connected to the integrating means, whereby the digital counting means digitally represents the deviation of the unknown resistance from a predetermined resistance value.

2. A resistance deviation measuring device as claimed in claim 1 wherein the time interval measured by the digital counting means is initiated a predetermined amount of time after the reference voltage is connected to the integrating means which is equal to the predetermined period of time for which the analog signal is connected to the integrating means, whereby the digital counting means represents the deviation of the unknown resistance from the reference resistance.

3. A resistance deviation measuring device as claimed in claim 2 wherein the unknown resistance is a temperature-sensing resistance, and wherein the reference resistance is provided with a predetermined resistance value representing a predetermined temperature value.

4. A resistance deviation measuring device as claimed in claim 1 further comprising timing signal means generating timing signal pulses, said switch means being responsive to the timing signal means to measure said predetermined period of time, and said digital counting means being responsive to said timing signal means to initiate its measured time interval.

5. A resistance deviation measurement device as claimed in claim 4 wherein said timing signal pulses include a first pulse to which the switch means responds by connecting the analog signal to the integrating means, a second pulse to which the switch means responds by connecting the reference signal to the integrating means, and a third pulse to which the digital counting means responds by initiating the measured interval, said first, second and third pulses being equally spaced in time.

6. A resistance deviation measuring device as claimed in claim 1 wherein said switching means is arranged to disconnect the integrating means from both the analog signal and the reference signal after the integrating means is restored to its initial value.

7. A resistance deviation measuring device as claimed in claim 1 wherein said reference resistance and said unknown resistance are connected in series with each other, and wherein the means for generating the same current flow through the unknown resistance and reference resistance comprises a voltage source.

8. A resistance deviation measuring device as claimed in claim 7 wherein the junction of the unknown resistance and reference resistance is connected to the ground level of the integrating means, and wherein said switch means comprises switch contacts respectively connected to said resistances opposite said ground connection, and comprises means for alternatively connecting the contacts to the integrating means, whereby the voltages across the resistances are applied to the integrating means.

* * * * *